(12) United States Patent
Cok et al.

(10) Patent No.: US 8,930,811 B2
(45) Date of Patent: Jan. 6, 2015

(54) METHOD FOR MAKING MULTI-ELEMENT IMAGE TEMPLATES

(75) Inventors: Ronald Steven Cok, Rochester, NY (US); John Randall Fredlund, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 150 days.

(21) Appl. No.: 13/163,785

(22) Filed: Jun. 20, 2011

(65) Prior Publication Data

US 2012/0324343 A1 Dec. 20, 2012

(51) Int. Cl.
*G06F 3/00* (2006.01)
*H04N 1/00* (2006.01)

(52) U.S. Cl.
CPC ....... *H04N 1/00137* (2013.01); *H04N 1/00143* (2013.01); *H04N 1/00145* (2013.01); *H04N 1/00161* (2013.01); *H04N 1/00164* (2013.01); *H04N 1/00175* (2013.01); *H04N 1/00177* (2013.01); *H04N 1/00196* (2013.01)
USPC ........................................................ 715/247

(58) Field of Classification Search
USPC .................. 715/200, 234, 243, 254, 255, 247
See application file for complete search history.

(56) References Cited

U.S. PATENT DOCUMENTS

| | | | |
|---|---|---|---|
| 2003/0007167 A1* | 1/2003 | Catt et al. | 358/1.12 |
| 2010/0164992 A1* | 7/2010 | Akiya | 345/641 |
| 2011/0213795 A1* | 9/2011 | Lee et al. | 707/769 |
| 2012/0179995 A1* | 7/2012 | Cok et al. | 715/810 |

FOREIGN PATENT DOCUMENTS

JP 2009-058861 * 3/2009

OTHER PUBLICATIONS

"Two-page photo spreads in BookSmart," published Jun. 26, 2007, pp. 1-3.*
"Picture More—The Shutterfly Community Blog: How to create a 2-page spread," published Mar. 10, 2010, pp. 1-7.*
"One image across two page spread?" Aug. 12, 2009, <http://forums.adobe.com/thread/476380>, pp. 1-13.*

* cited by examiner

*Primary Examiner* — Kyle Stork
(74) *Attorney, Agent, or Firm* — Hogan Lovells US LLP

(57) ABSTRACT

A method of making an image product includes receiving a template selection from a user, the template including a template graphic and a plurality of different openings in the template graphic, each opening surrounded by at least a portion of the template graphic. The method further includes receiving a single image selection from a user and compositing the single image into two or more of the plurality of different openings in the template graphic, so that two different portions of the single image are located in two different openings in the template graphic and the two different portions of the single image have the same relative locations in the composition as in the single image.

15 Claims, 15 Drawing Sheets

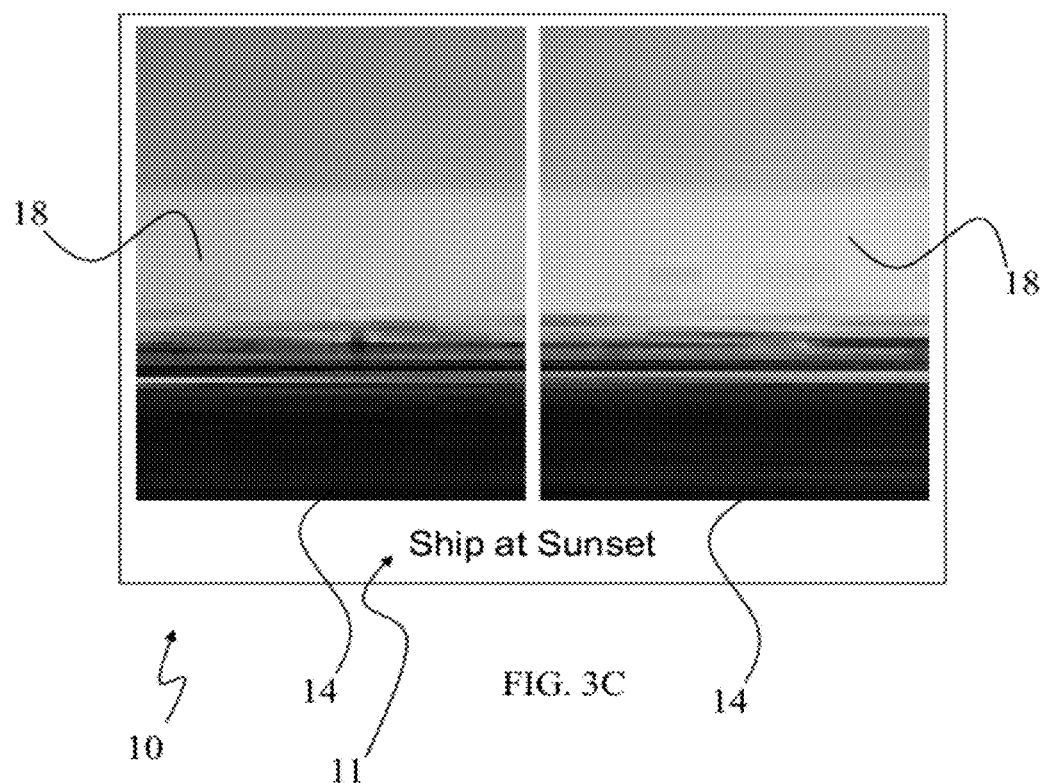

METHOD FOR MAKING MULTI-ELEMENT IMAGE TEMPLATES

CROSS-REFERENCE TO RELATED APPLICATION

Reference is made to commonly-assigned U.S. patent application Ser. No. 13/163,787 filed Jun. 20, 2011, entitled "Method for Making Multi-Element Image Templates" by Ronald S. Cok et al, the disclosure of which is incorporated herein.

FIELD OF THE INVENTION

This invention pertains to the field of digital imaging and more particularly to systems for increasing the aesthetic value of images in image-based products and, in particular, background templates.

BACKGROUND OF THE INVENTION

Digital images are widely used to commemorate events in people's lives. Such digital images are typically captured by digital cameras, stored temporarily in the digital cameras and then stored in electronic storage systems such as home computers. The availability of internet-accessible computers has also led to on-line digital image storage, for example with on-line data storage services, photo-merchandising services, social networking websites, and photo-sharing websites.

Products that include digital images are a popular keepsake or gift for many people. Such products typically include a picture taken by an individual that is inserted into a product intended to enhance the product, the presentation of the image, or to provide storage for the image. Examples of such products include picture albums, photo-collages, posters, picture calendars, picture mugs, picture ornaments, picture mouse pads, and picture post cards.

Users who make image-based products usually desire to share the products with others. Such sharing can take the form of printed products or electronic versions of the products, for example by displaying the products on a computer screen. Obviously, some image products are not readily amenable to an electronic experience, for example image-enhanced mugs or mouse pads are best enjoyed as physical products, while other image products can be enjoyed electronically, for example photobooks, greeting cards, and photo-collages.

Images can be combined with other images, for example templates including background images and one or more image openings into which an individual's images can be inserted, either mechanically or electronically with a computer, to form a combined image that displays the individual's images in a pleasing or preferred manner. These image products can be provided in hard-copy form, for example as a printed photo-book, or in electronic form presented by a computer, for example in an on-line album. Imaging products can also include multi-media products, especially when in electronic form, that, for example, can include motion image sequences or audio tracks. However, templates found in the prior art can limit the artistic expression of images. Conversely, unconstrained graphic freedom is overwhelming for non-expert users. There is a need, therefore, for improvements in methods and systems used for combining images and templates in image-based products.

SUMMARY OF THE INVENTION

A method of making an image product, comprises:
receiving a template selection from a user, the template including a template graphic and a plurality of different openings in the template graphic, each opening surrounded by at least a portion of the template graphic;
receiving a single image selection from a user; and
compositing the single image into two or more of the plurality of different openings in the template graphic, so that two different portions of the single image are located in two different openings in the template graphic and the two different portions of the single image have the same relative locations in the composition as in the single image.

This invention has the advantage that images and templates can be provided in more aesthetic and flexible combinations. In particular, the present invention provides a way to facilitate the use of multi-opening templates with single images. An application of this invention is the production of multi-page panoramic prints.

BRIEF DESCRIPTION OF THE DRAWINGS

FIG. 3C is a composition including a template and an image according to an embodiment of the present invention;

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein can also be selected from such systems, algorithms, components, and elements known in the art. Given the system as described according to the invention in the following, software not specifically shown, suggested, or described herein that is useful for implementation of the invention is conventional and within the ordinary skill in such arts.

The present invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one skilled in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image file", as used herein, refers to any digital image file, such as a digital still image or a digital video file. The digital image file can include audio or other non-visual information.

Figure 1:
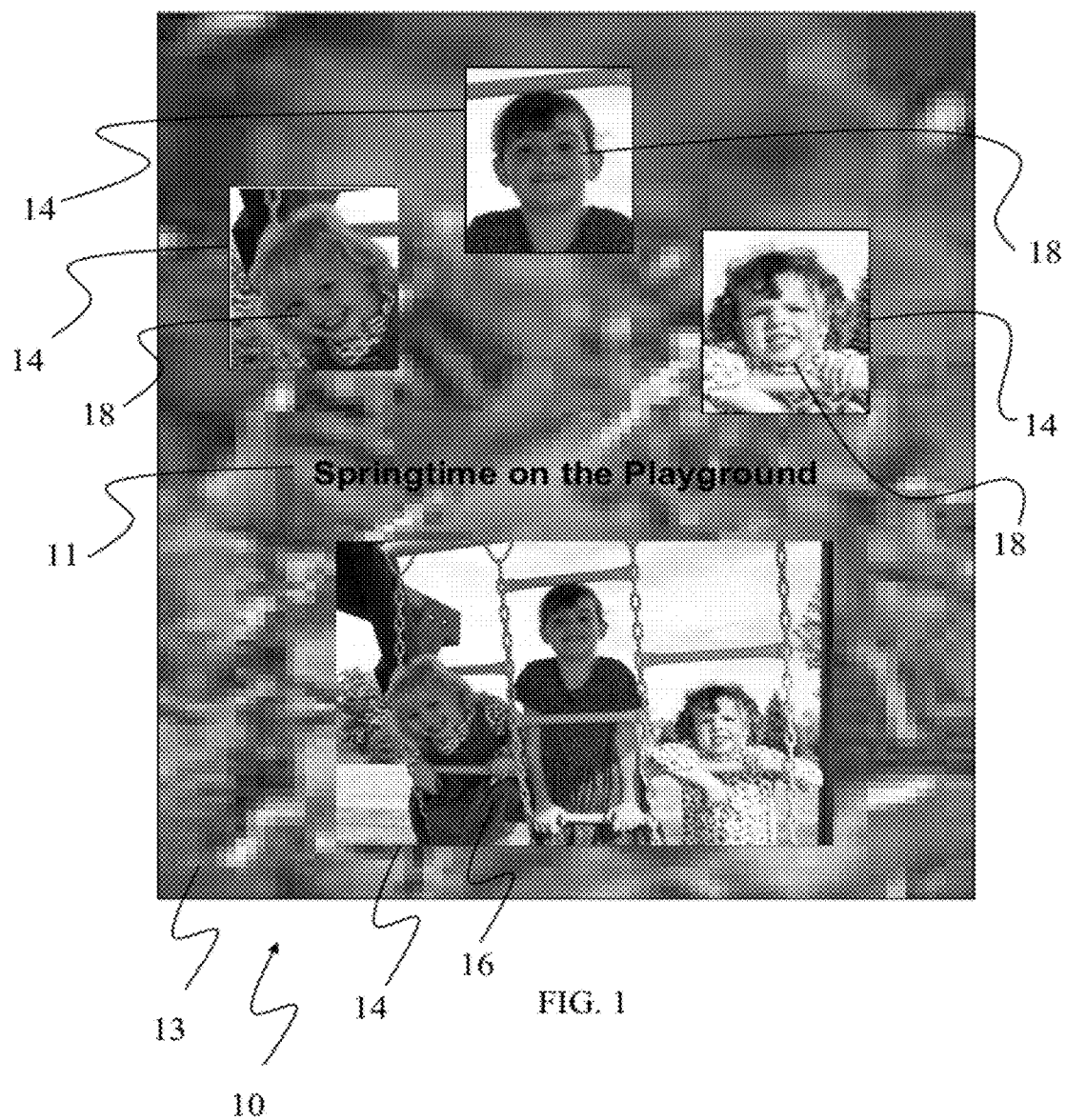
FIG. 1 is a composition including an image and a template according to an embodiment of the present invention.
Figure 2A:
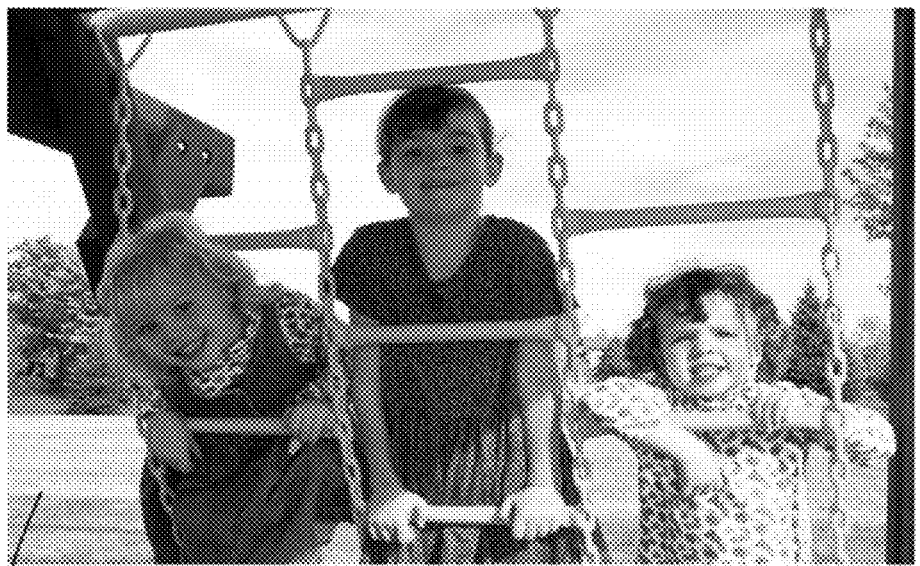
FIG. 2A is an image used in the composition of FIG. 1 and useful in understanding the present invention.
Figure 2B:
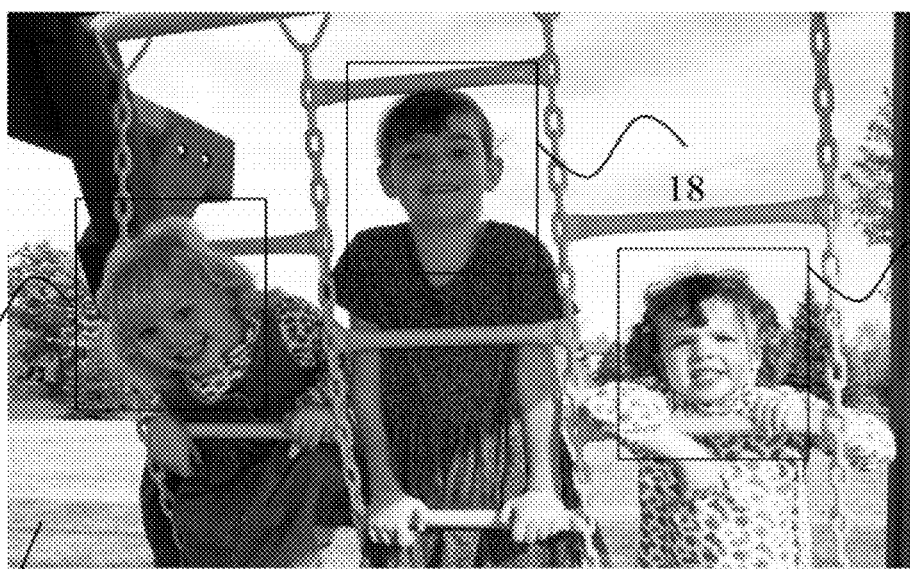
FIG. 2B is an image with selected portions illustrated used in the composition of FIG. 1 and useful in understanding the present invention.
Figure 2C:
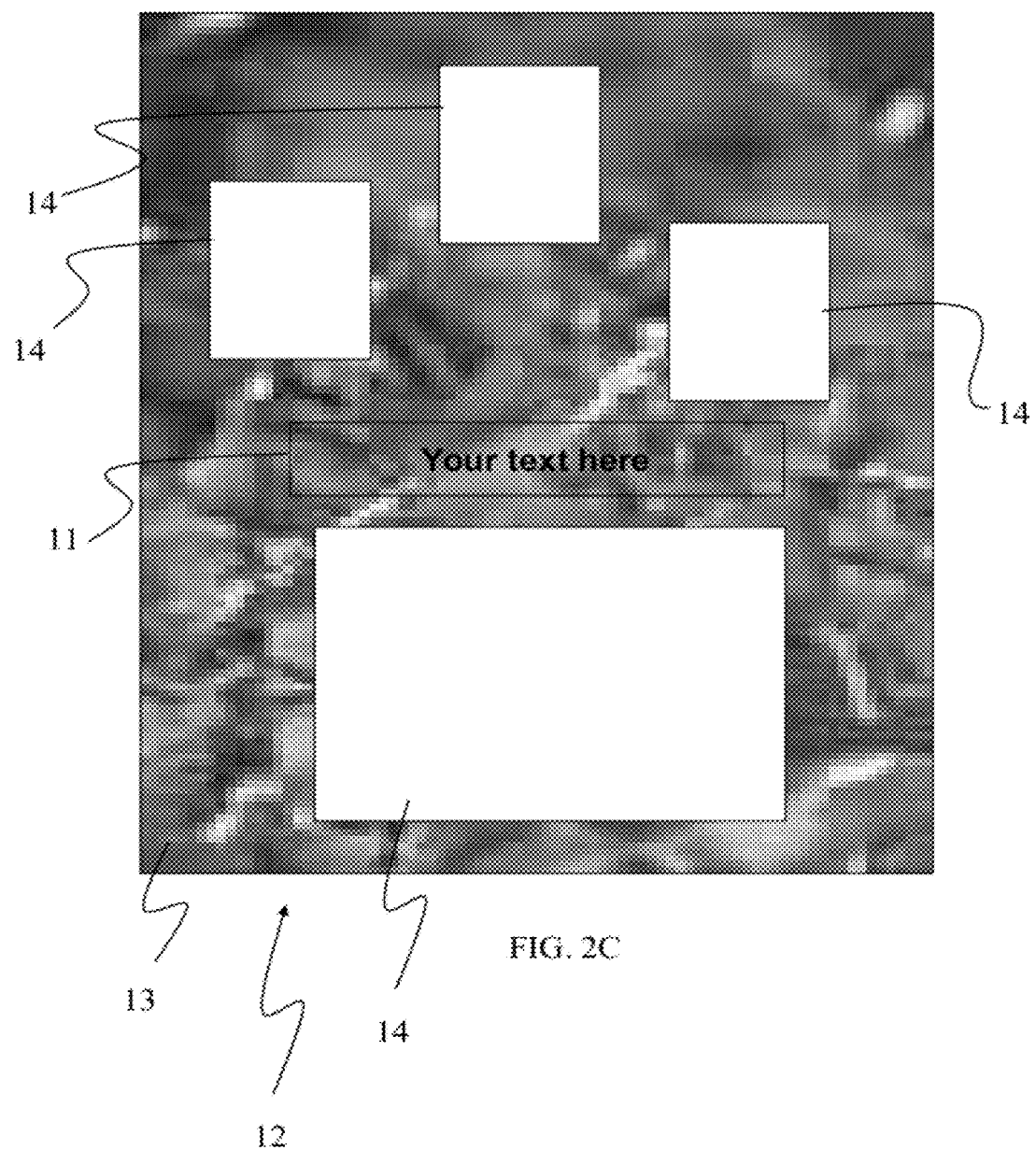
FIG. 2C is an illustration of a template used in the composition of FIG. 1 according to an embodiment of the present invention.

According to an embodiment of the present invention, referring to FIGS. 1, 2A-2C, and 5, a method of making an image product includes receiving a template 12 (FIG. 2C) selection from a user in step 200. The template 12 includes a template graphic 13, for example an image as illustrated in FIG. 2C, and a plurality of openings 14 in the template graphic 13. In step 205, an image 16 (FIG. 2A) selection is received from a user. The received selected image 16 is composited (step 215) into two or more of the plurality of openings 14, so that two different portions 18 of the image 16 are located in two different openings 14 and the two different portions 18 have the same relative locations in a composition 10 as in the image 16. The relative position of the image 16 relative to the template 12 can be received with the image 16 or received separately (optional step 212) before the composite step 215. For example, a user might interactively move the image 16 with respect to the template 12 to select an aesthetic combination of image 16 and template 12 and then send the position information. A user can view the composition 10 by translating the selected image 16 behind the template 12 and viewing a composited combination 10 until a suitable arrangement is found. Once the relative position of the image 16 (and portions 18) with respect to the template 12 is determined, the image portions 18 and template 12 are combined to form the composition 10 (step 220). The composition 10 can be produced and delivered to a customer (step 225).

Referring to FIG. 2B, the relative locations of the portions 18 of the image 16 are illustrated and matched to the openings 14 of FIG. 2C. As shown in FIG. 2C, text 11 can also be specified in the template 12. FIG. 1 illustrates the composition 10 with the portions 18 of image 16 in openings 14, with the template graphic 13 image and user-selected text 11.

By the same relative locations in the composition 10 as in the image 16 is meant that the relative size (for example percent of the image) and relative positions (for example the distance from the side and top edge of the image as a percent of the image width and height) of the portions 18 are maintained in the image 16, even if the image 16 is enlarged or reduced (for example by zooming). If the image 16 is cropped before it is located with respect to the template 12, the cropped image is the image selection received from the user.

According to another embodiment of the present invention, referring to FIGS. 1, 2A-2C, 5, and 11, a method of making an image product includes receiving a selection of images 16 and object-of-interest type (step 206). In the example embodiment of FIGS. 1, 2A-2C, the type of object of interest is faces. This can also be the default selection. Image 16 is analyzed for objects of interest of the selected type (step 208). An alternative template 12 (FIG. 2C) can optionally be selected for the user in step 209, for example a template 12 having a number of openings 14 matched to the number of objects found in the image 16 or a shape of opening 14 (e.g. portrait, landscape) corresponding to the shape of the object. In another example, a user-selected template (step 200, FIG. 5) could be modified (step 210), for example by providing a number or shape of openings 14 to match the object type or number of objects found. The template 12 selected includes an opening 14 for image 16 and openings 14 for the detected objects of interest. At this point, the process proceeds as before with step 210.

According to another embodiment of the present invention, referring to FIGS. 1, 2A-2C, 5, and 11, a method of making an image product includes receiving a selection of image 16 and selections of objects of interest (step 207). In this embodiment the object or objects of interest are selected by the user. This can also be the default selection. Image 16 is analyzed using segmentation or object identification algorithms known in the art to determine object boundaries and appropriate openings specifications are generated (step 208). Template 12 (FIG. 2C) is selected for the user in step 209 on the basis of object of interest selections and the image analysis. Alternatively, a user-selected template (step 200 in FIG. 5) can be modified in step 210 as described above. The template 12 includes an opening 14 for image 16 and openings 14 for the selected objects of interest. At this point, the process proceeds as before with step 210.

Note that image openings 14 can be specified according to types of object of interest. For example, if faces are the objects of interest, the template 12 can specify oval image openings that are well matched to that type of object. If boats are the type of object of interest selected, a template with openings that are wider than they are high would be specified.

Figure 3A:
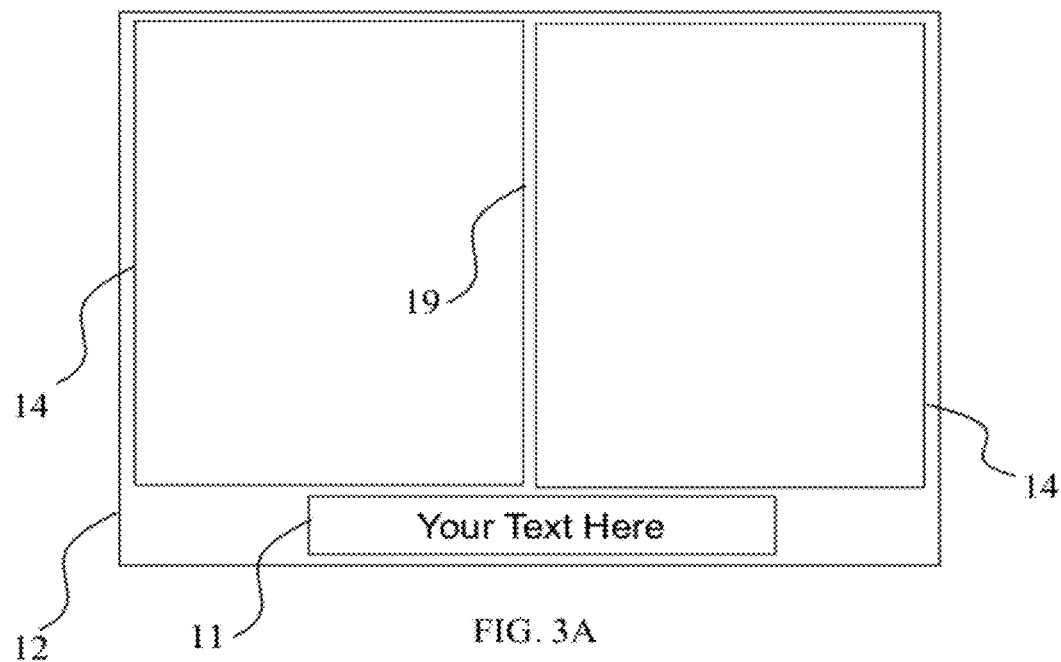
FIG. 3A is a template illustration according to an embodiment of the present invention.
Figure 3B:
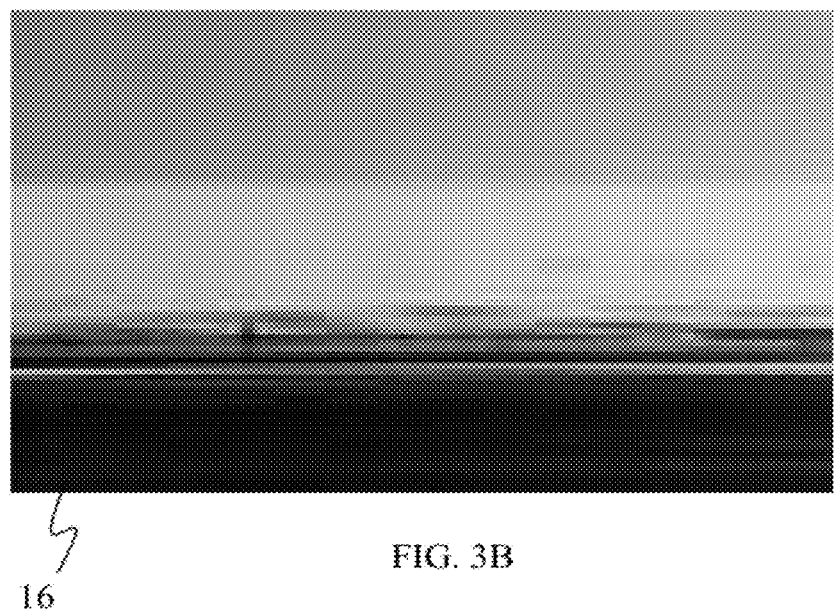
FIG. 3B is an image useful in understanding the present invention.
Figure 12:
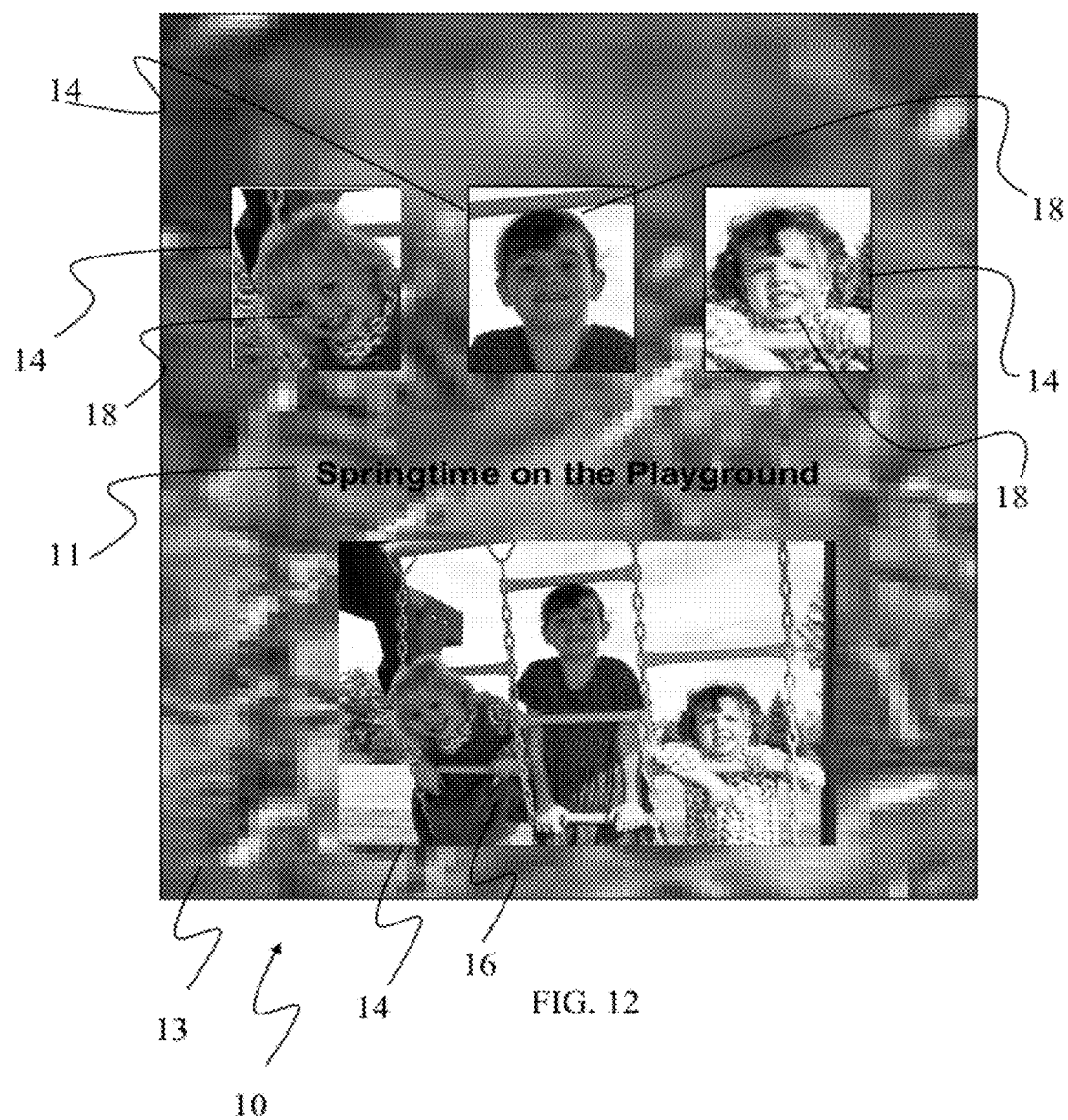
FIG. 12 is a composition constraining the relative position of image portions in a single dimension according to another embodiment of the present invention.

Referring to FIG. 3A, in a further embodiment of the present invention, the template 12 is a multi-page template 12 and is employed in a multi-page book, for example a photo-book. A multi-page template 12 is a template 12 that is printed on more than one page, for example, a two-page template. Moreover, a two-page template 12 can be printed on two facing pages in a book. The multi-page template 12 can have one opening 14 per page, as shown in FIG. 12, or more than one opening per page. The number of openings 14 on each page can be different on different pages. If more than one opening 14 per page is provided in the template 12, the openings 14 can have the same size, or can be different. A multi-page template 14 can have space, for example a gutter 19, between the openings 14 on different pages that is aligned with or centered on the adjacent edges of the multiple pages. FIG. 3B illustrates the image 16 that is composited into the template 12 of FIG. 3A to form the composition 10 (FIG. 3C)

with image portions 18 positioned in the openings 14. Text 11 can be centered beneath both openings 14 together. Note that the width of gutter 19 can change based on binding type. In bindings for which the pages can open completely flat such that the entirety of both pages are visible, gutter 19 can have a minimal width or no width. In other more book-like bindings where the pages cannot be laid completely flat, a larger gutter 19 can be used.

In a further embodiment of the present invention, the relative position of the image portions 18 is controlled in only one dimension, for example horizontally. For example, in a group picture of two rows of people, it can be desired to provide image portions of faces taken from people in both rows and align the image portion faces 18 in a single horizontal row. FIG. 12 illustrates the embodiment using the images and portions of FIGS. 2A and 2B.

In further embodiments of the present invention, panoramic images can be used with multi-page templates 12. Templates 12 can extend over more than two pages or can be applied to fold-out pages.

Figure 4A:
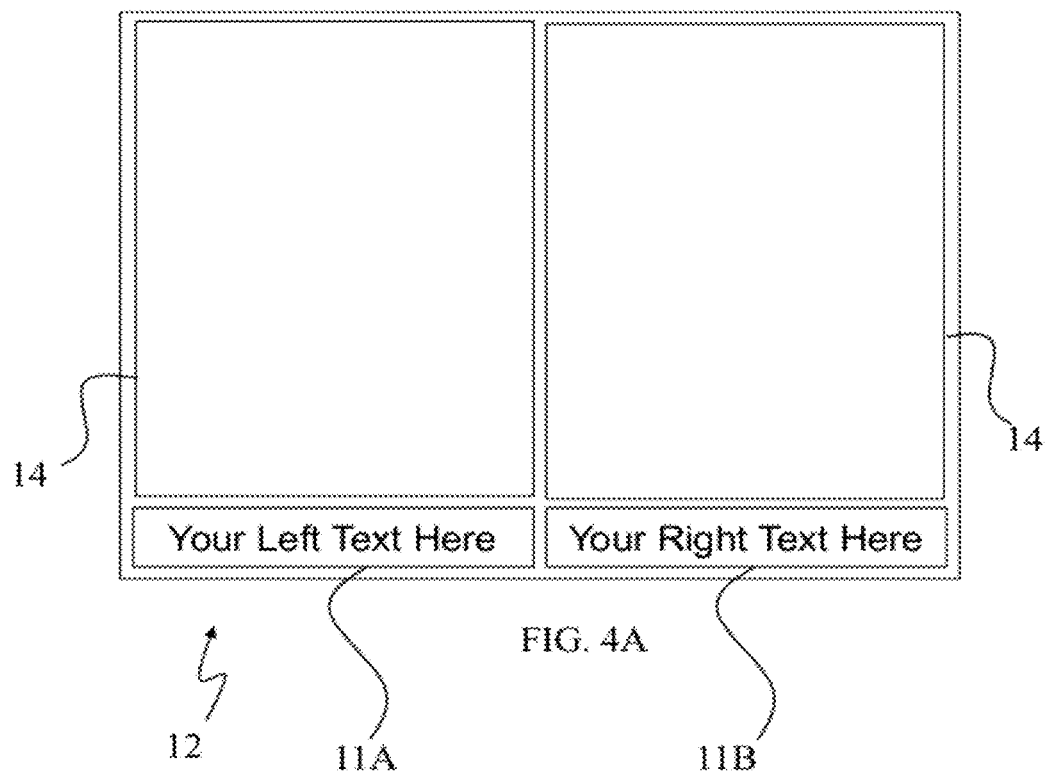
FIG. 4A is a template illustration according to an embodiment of the present invention.
Figure 4B:
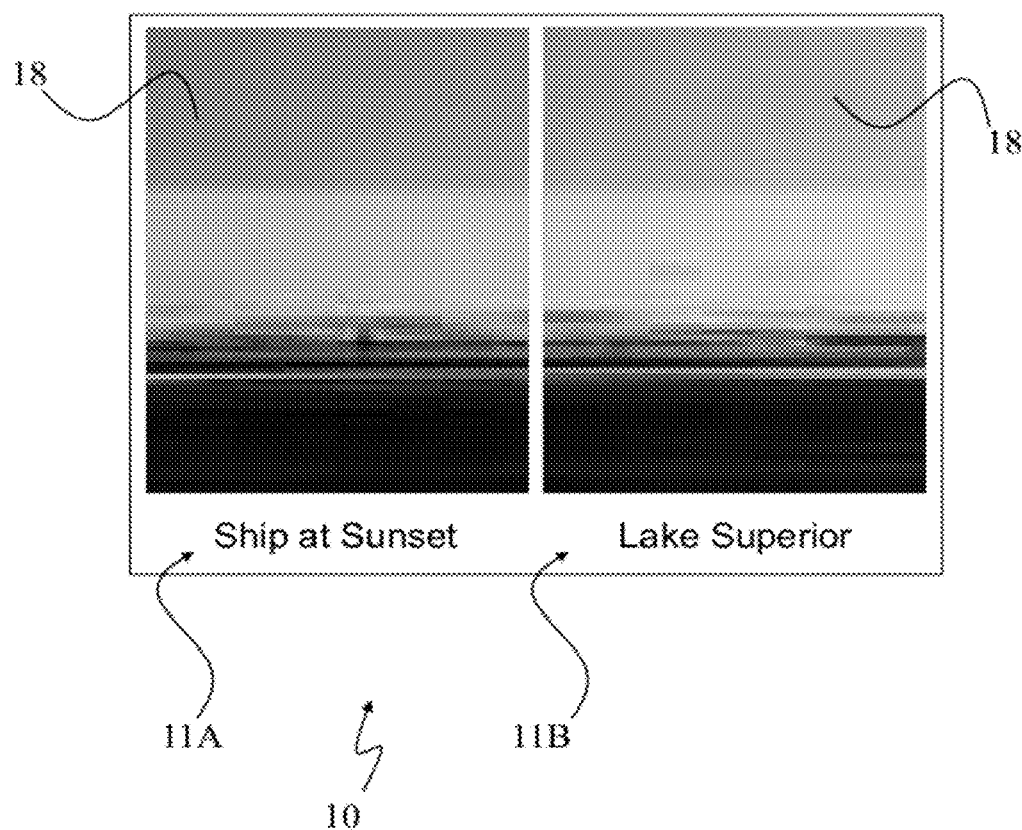
FIG. 4B is a composition including a template and the image of FIG. 3B according to an embodiment of the present invention.
Figure 5:
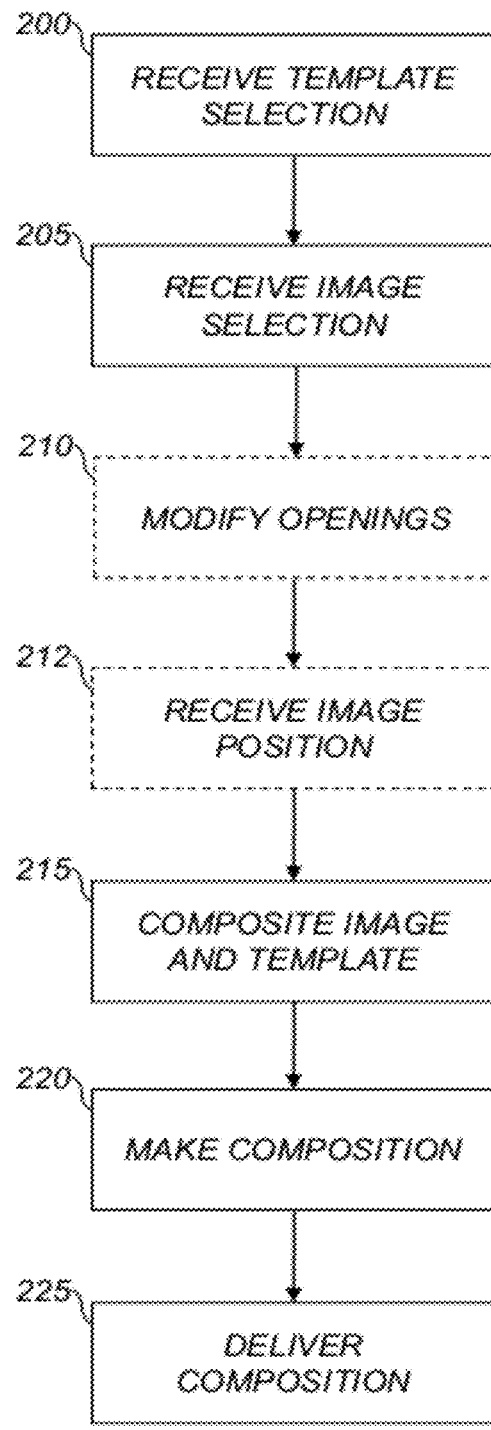
FIG. 5 is a flow diagram illustrating various embodiments of the present invention.

In an alternative, referring to FIG. 4A, text 11A and 11B can be centered on each page or opening 14 of the template 12. FIG. 4B shows the resulting composition 10 with image portions 18 taken from image 16 (FIG. 3B) and text 11A and 11B centered beneath the openings 14.

Figure 10:
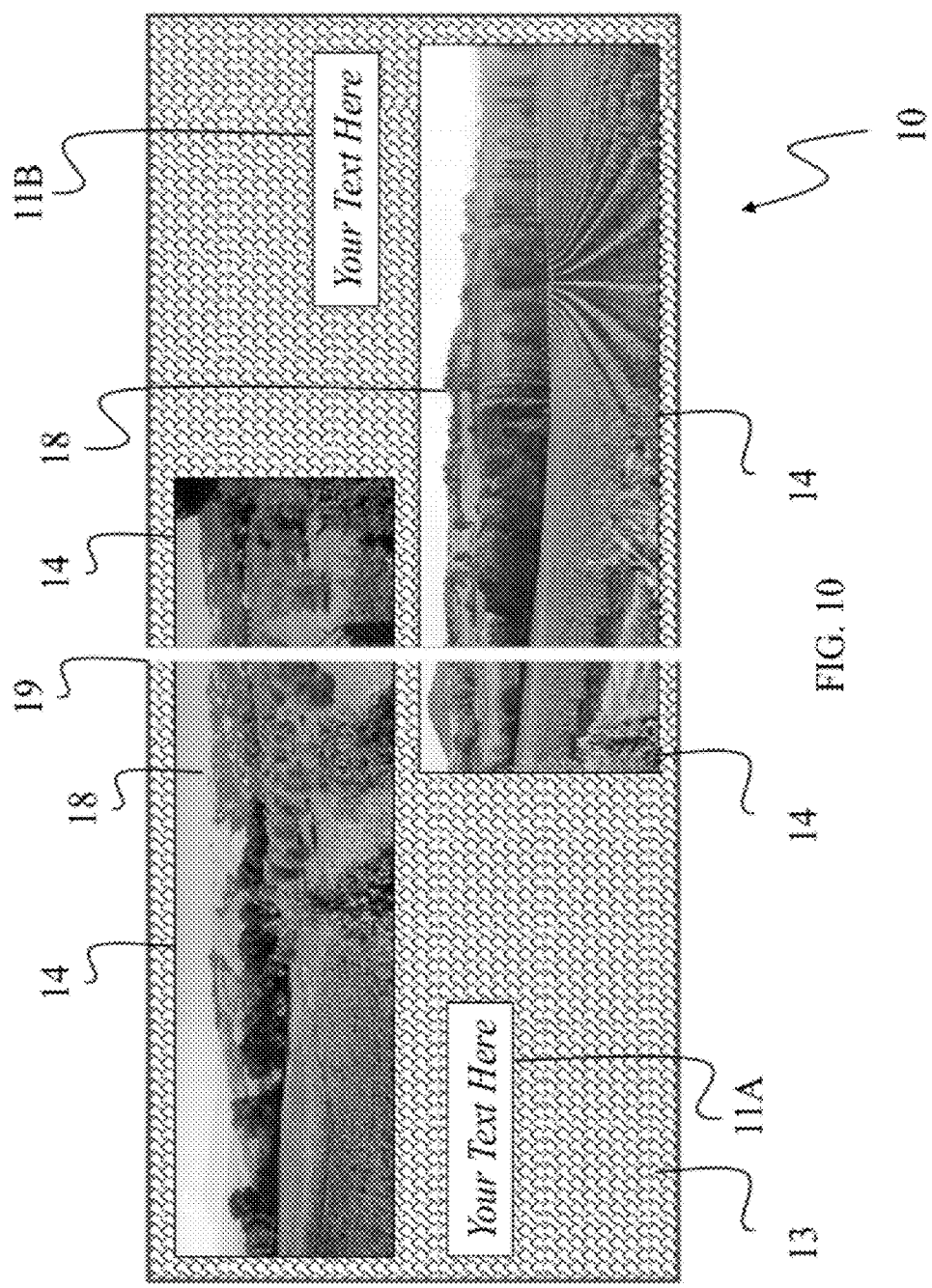
FIG. 10 is a composition including two images and a multi-page, multi-opening template according to an embodiment of the present invention.
Figure 11:
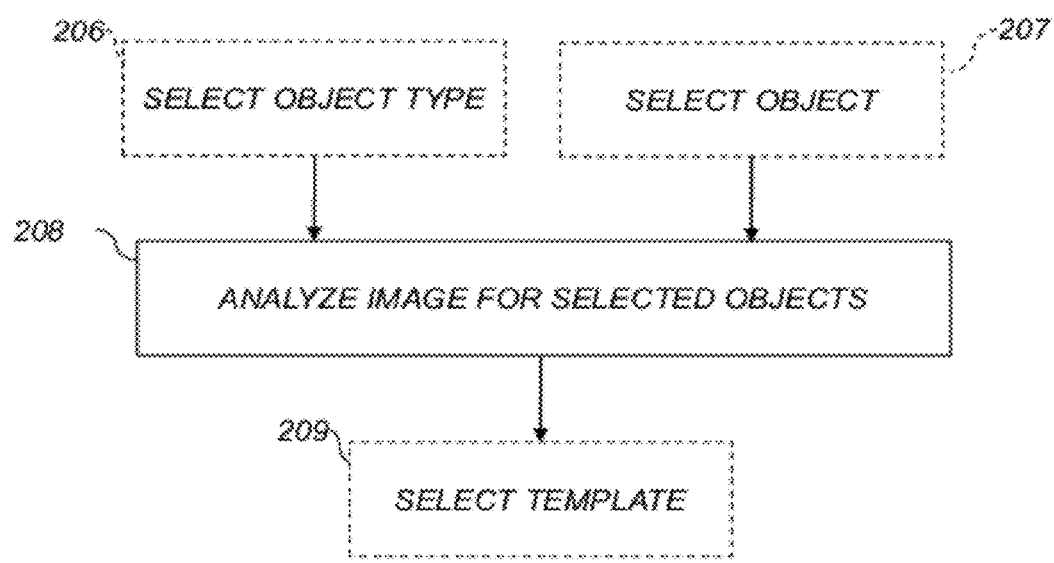
FIG. 11 is a flow diagram illustrating an alternative embodiment of the present invention.

In an embodiment of the present invention, the template 12 has a plurality of openings 14 on a page and a plurality of images 16 is included on the page corresponding to the plurality of openings 14. Referring to FIG. 10, a composition 10 can have a multi-page template 12 that has multiple openings 14 per page with image portions 18 composited therein, the template graphic 13 and text 11A and 11B on facing pages. The gutter 19 separates the image portions 18; because the image portions 18 have the same relative positioning in the openings 14 as in the image, a portion of the image is obscured by the gutter 19. As shown, the openings 14 on each page have a different size. Furthermore, the combined opening sizes for each pair of openings 14 on facing pages can have different sizes. In this case, the specifications of the template 12 can include height constraints for the openings 14 while permitting the width dimension of the opening 14 to be determined by the images 16 themselves. Thus, for the top opening 14 in FIG. 10, the position of the left edge of opening 14 and the height of opening 14 and the height of image 16 as rendered on the page are specified. The right edge of the opening 14 can be varied according to the width dimension of the image 16 selected. Similarly, for the bottom opening 14 in FIG. 10, the right edge of opening 14 and its height are specified while the left edge position can vary with the dimensions of the image 16 selected.

Figure 9:
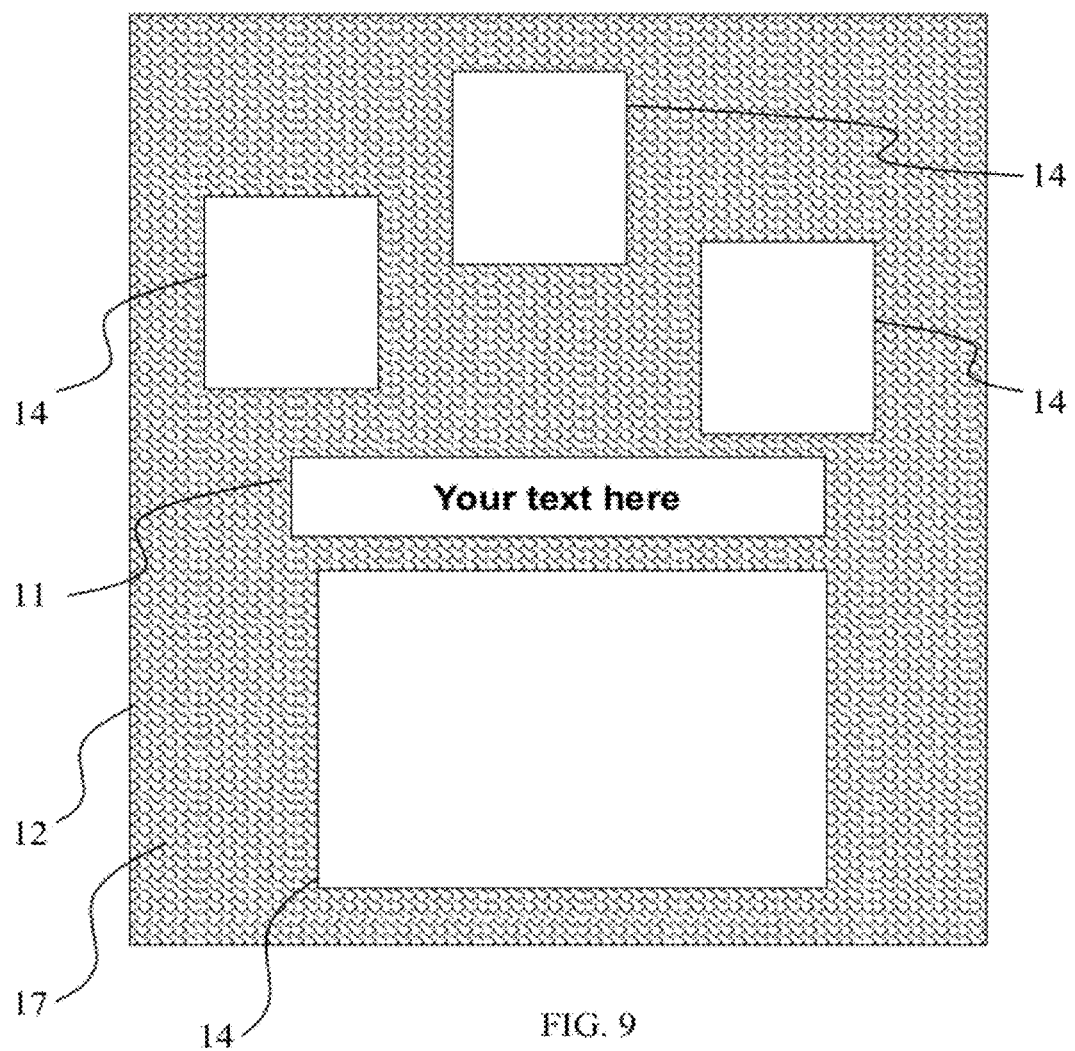
FIG. 9 is template illustration having graphic background elements according to an embodiment of the present invention.

According to an embodiment of the present invention, the template 12 includes the template graphic 13. The template graphic 13 can be an image 16, or plurality of images 16. As shown in FIG. 9, the template graphic 13 can be a designed graphic element 17, for example a drawing, design, or other artwork in the template 12. Alternatively, both images 16 and designed elements 17 can be included in the template graphic 13. The template 12 of FIG. 9 also includes text 11 and openings 14.

In another embodiment of the present invention, the positions or sizes of the openings 14 in the template 12 can be modified, for example by employing a graphic user interface, using methods known in the art. The modifications can be done in conjunction with the selected image 16 so as to optimize the aesthetic value of the composition 10.

In yet another embodiment of the present invention, the composition 10 is made as an image product and provided to the user or to a person designated by the user or another purchaser of the image product.

Figure 7:
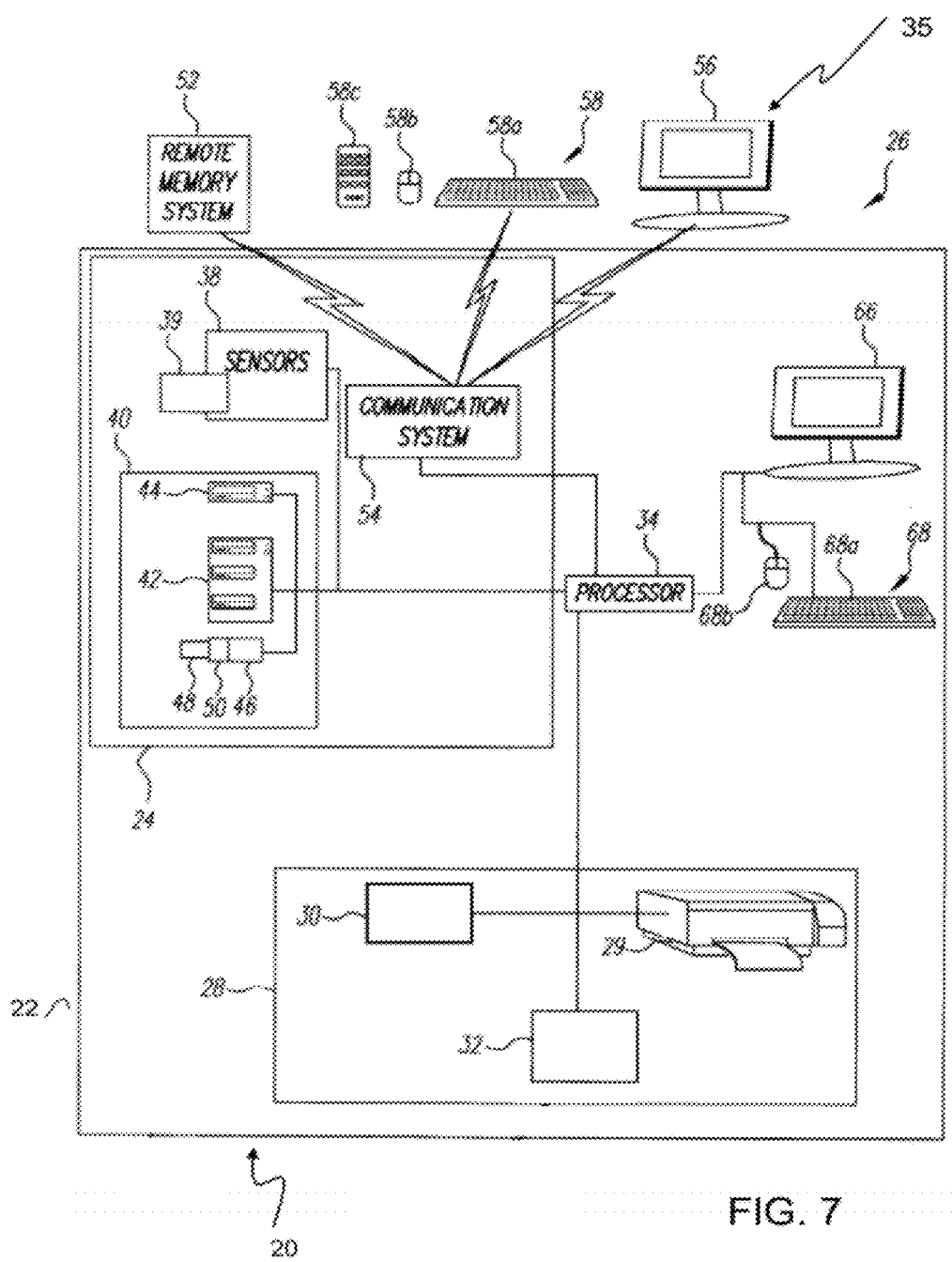
FIG. 7 is schematic of a computer system useful in the present invention.

An embodiment of the present invention includes a system for making an image product. The system includes a computer having a processor 34 (FIG. 7) and a memory 40 (FIG. 7). The template 12 is stored in the memory 40. The template 12 includes the template graphic 13 and a plurality of openings 14 in the template graphic 13. The image 16 is stored in the memory 40 and the processor 34 composites the image 16 into two or more of the plurality of openings 14, so that two different portions of the image 16 are located in two different openings 14 and the two different portions 18 have the same relative locations in the composition 10 as in the user image 16.

The template 12 can be a multi-page template, such as a two-page template. The image product can be a multi-page book, such as a photo-book. The template 12 can have an opening 14 on each page of the multi-page template, or the template 12 can have multiple openings on one or more pages of the multi-page book. The openings 14 on one page can have the same size or have different sizes. The openings 14 in a multi-page template 12 can be positioned on facing pages in a multi-page book. The multi-page template 12 can have space, for example the gutter 19, between the openings 14 on different pages that is aligned with or centered on the adjacent edges of the multiple pages.

The processor 34 can modify the position of one or more openings in the template 12.

Figure 6:
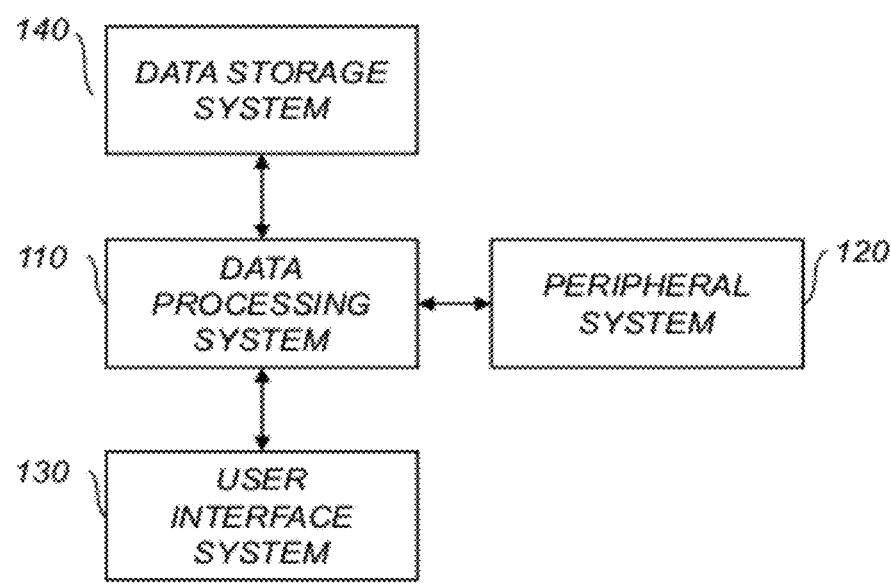
FIG. 6 is a high-level schematic showing the components of a system for providing content and annotations according to an embodiment of the present invention.

FIG. 6 is a high-level diagram showing the components of a system for compositing user images and templates according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a digital camera, a digital picture frame, cellular phone, a cellular phone with voice services, digital network services, or internet access services, or any other device for processing data, managing data, handling data, or communicating data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 can be a distributed processor-accessible memory system including multiple processor-accessible memories communicatively connected to the data processing system 110 via a plurality of computers or devices. On the other hand, the data storage system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital content records to the data processing system 110. For example, the peripheral system 120 can include digital still cameras, digital video cameras, cellular phones, or other data processors. The data processing system 110, upon receipt of digital content records from a device in the peripheral system 120, can store such digital content records in the data storage system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the data storage system 140 even though the user interface system 130 and the data storage system 140 are shown separately in FIG. 1.

Figure 8:
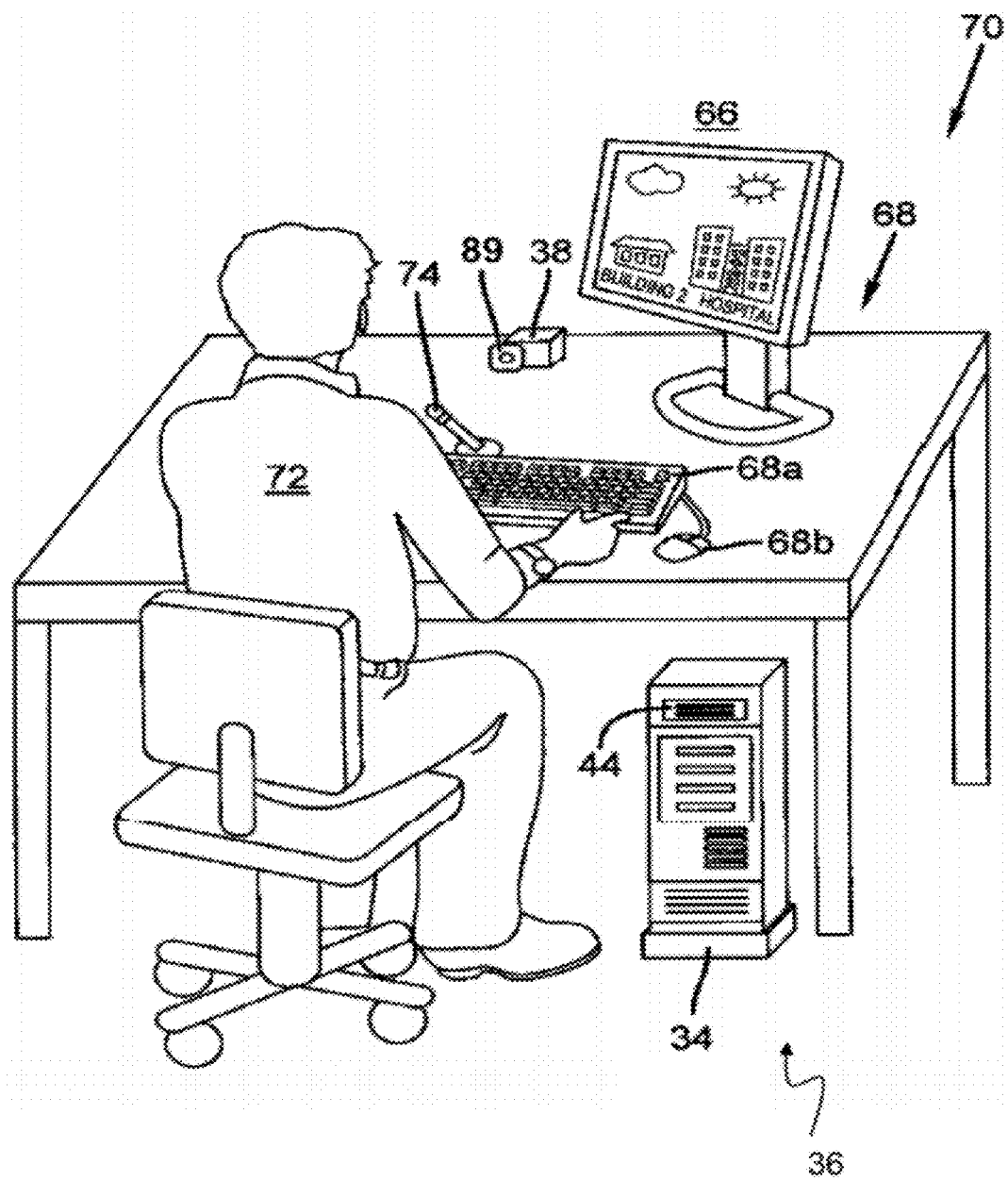
FIG. 8 is schematic of a computer system useful in the present invention.

FIGS. 7 and 8 illustrate more detailed embodiments of electronic systems, for example computers, useful for enabling the present invention. In one embodiment, for example, a desktop or laptop computer executing a software application can provide a computing apparatus suitable for accessing images and templates, and compositing them according to the various embodiments of the present invention.

In another embodiment, a computer server can provide web pages that are served over a network, for example the internet, to a remote client computer. The web pages can permit a user of the remote client computer to design and construct an image composition. Application software provided by the web server to a remote client can enable presentation of selected multi-media elements, either as stand-alone software tools or provided through html, Java, or other known-internet interactive tools. In such an embodiment, a server computer is connected to a remote client computer through a computer network. In collaboration with the remote client computer, the server or remote client computers use a processor to composite a selected template and user image as described above.

In an embodiment, a system useful for the present invention can include an electronic system for making an image product that includes a computer including a processor and a memory, a template stored in the memory, the template including a template graphic 13 and a plurality of openings in the template graphic, and an image stored in the memory. The processor composites the image into two or more of the plurality of openings so that two different portions of the image are located in two different openings and the two different portions have the same relative locations in the composition as in the user image.

Referring to FIGS. 7 and 8, computers, computer servers, and a communication system are illustrated together with various elements and components that are useful in accordance with various embodiment of the present invention. FIG. 7 illustrates a first embodiment of a system 20, for example an electronic system, which can be used in generating an image product. The system 20 can be a computer. In the embodiment of FIG. 7, system 20 includes a housing 22 and a source of content data files 24, a user input system 26 and an output system 28 connected to the processor 34. The source of content data files 24, user-input system 26 or output system 28 and processor 34 can be located within housing 22 as illustrated. In other embodiments, circuits and systems of the source of content data files 24, user input system 26 or output system 28 can be located in whole or in part outside of housing 22.

The source of content data files 24 can include any form of electronic or other circuit or system that can supply digital data to processor 34 from which processor 34 can derive images for use in forming an image-enhanced item. In this regard, the content data files 24 can include, for example and without limitation, still images, image sequences, video graphics, and computer-generated images. Source of content data files 24 can optionally capture images to create content data for use in content data files 24 by use of capture devices located at, or connected to, system 20 or can obtain content data files 24 that have been prepared by or using other devices. In the embodiment of FIG. 7, source of content data files 24 includes sensors 38, the memory 40 and a communication system 54.

Sensors 38 are optional and can include light sensors, biometric sensors and other sensors known in the art that can be used to detect conditions in the environment of system 20 and to convert this information into a form that can be used by processor 34 of system 20. Sensors 38 can also include one or more video sensors 39 that are adapted to capture images. Sensors 38 can also include biometric or other sensors for measuring involuntary physical and mental reactions such sensors 38 including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within system 20 or it can be removable. In the embodiment of FIG. 7, system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as a personal computer, computer network or other digital system. Remote memory system 52 can also include solid-state, magnetic, optical or other data-storage devices.

In the embodiment shown in FIG. 7, system 20 has a communication system 54 that in this embodiment can be used to communicate with an optional remote memory system 52, an optional remote display 56, or optional remote input 58. The optional remote memory system 52, optional remote display 56, optional remote keyboard 58a can all be part of a remote system 35 having an input station having remote input controls (referred to herein as "remote input 58"), can include the remote display 56, and that can communicate with communication system 54 wirelessly as illustrated or can communicate in a wired fashion through a communication or sharing output 32. In an alternative embodiment, a local input station including either or both of a local display 66 and local input controls 68 (also referred to herein as "local user input 68") can be connected to communication system 54 using a wired or wireless connection.

Communication system 54 can include for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), the remote memory system 52 or the remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system. In one useful embodiment, the system 20 can provide web access services to remotely connected computer systems (remote systems 35) that access the system 20 through a web browser. Alternatively, remote system 35 can provide web services to system 20 depending on the configurations of the systems.

User input system 26 provides a way for a user of system 20 to provide instructions to processor 34. This permits such a user to make a designation of content data files 24 to be used in generating an image-enhanced output product and to select an output form for the output product. User input system 26 can also be used for a variety of other purposes including, but not limited to, permitting a user to arrange, organize and edit content data files 24 to be incorporated into the image-enhanced output product, to provide information about the user or audience, to provide annotation data such as voice and text data, to identify characters in the content data files 24, and to perform such other interactions with system 20 as will be described later.

In this regard user input system 26 can include any form of transducer or other device capable of receiving an input from a user and converting this input into a form that can be used by processor 34. For example, user input system 26 can include a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 7, user input system 26 includes an optional remote input 58 including a remote keyboard 58a, a remote mouse 58b, and a remote control 58c and a local input 68 including a local keyboard 68a and a local mouse 68b.

Remote input 58 can take a variety of forms, including, but not limited to, the remote keyboard 58a, remote mouse 58b or remote control handheld device 58c illustrated in FIG. 7. Similarly, local input 68 can take a variety of forms. In the embodiment of FIG. 7, local display 66 and local user input 68 are shown directly connected to processor 34.

As is illustrated in FIG. 8, local user input 68 can take the form of a home computer, an editing studio, or kiosk 70 (hereafter also referred to as an "editing area 70") that can also be the remote system 35 or system 20. In this illustration, a user 72 is seated before a console including local keyboard 68a and mouse 68b and a local display 66 which is capable, for example, of displaying multimedia content, and a computer system 36 including the disk drive 44. As is also illustrated in FIG. 8, editing area 70 can also have sensors 38 including, but not limited to, video sensors 89, audio sensors 74 and other sensors such as multispectral sensors that can monitor user 72 during a production session.

Output system 28 (FIG. 7) is used for rendering images, text or other graphical representations in a manner that permits image-product designs to be combines with user items and converted into an image product. In this regard, output system 28 can include any conventional structure or system that is known for printing or recording images, including, but not limited to, a printer 29. Printer 29 can record images on a tangible surface 30 using a variety of known technologies including, but not limited to, conventional four-color offset separation printing or other contact printing, silk screening, dry electro-photography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as being of a type that generates color images. However, one can appreciate that this is not necessary and that the claimed methods and apparatuses herein can be practiced with a printer 29 that prints monotone images such as black and white, grayscale, or sepia toned images. As will be readily understood by those skilled in the art, the system 20 with which a user interacts to define a user-personalized image product can be separated from a remote system 35 connected to the printer 29, so that the specification of the image product is remote from its production.

In certain embodiments, the source of content data files 24, user input system 26 and output system 28 can share components.

Processor 34 operates system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components. The system 20 of FIGS. 7 and 8 can be employed to make and display an image product according to an embodiment of the present invention. The operations of the processor 34 on the photo-collage 10 or photo-collage specification can include the use of a computer program that executes on the processor 34 to rank the importance of one or more of the digital images stored in a memory. The computer program can include one or more non-transitory, tangible, computer-readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more processors or computers to practice the method according to the present invention.

The invention has been described in detail with particular reference to certain preferred embodiments thereof, but it will be understood that variations and modifications can be effected within the spirit and scope of the invention.

PARTS LIST 10 composition
11, 11A, 11B text
12 template
13 template graphic
14 opening
16 image
17 graphic elements
18 portions
19 gutter
20 system
22 housing
24 source of content data files
26 user input system
28 output system
29 printer
30 tangible surface
32 sharing output
34 processor
35 remote system
36 computer system
38 sensors
39 video sensors
40 memory
42 hard drive
44 disk drive
46 memory card slot
48 removable memory
50 memory interface
52 remote memory system
54 communication system
56 remote display
58 remote input
58a remote keyboard
58b remote mouse
58c remote control
66 local display
68 local input
68a local keyboard
68b local mouse
70 editing area (home computer, editing studio, or kiosk)
72 user
74 audio sensors
89 video sensors
110 data processing system
120 peripheral system
130 user interface system
140 data storage system
200 receive template selection step
205 receive image selection step
206 select object type step
207 select object step
208 analyze image for selected objects step
209 select template type
210 optional modify openings step
212 optional receive image position step
215 composite image and template step
220 make composition step
225 deliver composition step

The invention claimed is:

1. A method of making an image product, comprising:
receiving a template selection from a user, the template including a template graphic and a plurality of different openings in the template graphic, each opening surrounded by at least a portion of the template graphic;
receiving a single image selection from a user; and
automatically compositing the single image into two or more of the plurality of different openings in the template graphic to form a composition, so that two different portions of the single image are located in two different openings in the template graphic and the two different portions of the single image have the same relative locations in the composition as in the single image, wherein a portion of the single image is not displayed in the composition.

2. The method of claim 1, further including receiving a multi-page template selection.

3. The method of claim 2, further including receiving a two-page template selection.

4. The method of claim 3, further including receiving a two-page template selection with one opening on each of the two pages, with a first portion of a first image on a first page, a second portion of the first image on the second page, and the first and second portions of the first image have the same relative locations in the composition as in the first image.

5. The method of claim 3, further including receiving a two-page template selection with two openings on each of the two page, with a first portion of a second image on the first page, a second portion of the second image on the second page, and the first and second portions of the second image have the same relative locations in the composition as in the second image.

6. The method of claim 3, further including receiving a two-page template selection with two openings on each of the two pages and the two openings on each page are different from each other.

7. The method of claim 3, wherein the openings are separated by a gutter.

8. The method of claim 2, further including receiving a multi-page template selection with two openings.

9. The method of claim 1, further including receiving a template selection incorporating one or more images.

10. The method of claim 1, further including receiving a template selection incorporating designed graphic elements.

11. The method of claim 1, further including modifying the positions or sizes of the openings in the template.

12. The method of claim 1, further including having the image product made.

13. The method of claim 1, further including receiving an object selection or object type selection, analyzing the image for the selected objects or object types, and selecting or modifying the template in response to the image analysis.

14. The method of claim 1, wherein the two different portions have the same relative locations in the composition in a single dimension as in the image.

15. The method of claim 1, wherein the size of one dimension of at least one of the openings is constrained while the size of a second dimension is determined by the aspect ratio of the selected image.

* * * * *